United States Patent [19]

Kowalski

[11] Patent Number: 4,661,414
[45] Date of Patent: Apr. 28, 1987

[54] MULTI-LAYER FLEXIBLE PACKAGING MATERIAL

[75] Inventor: Gregg D. Kowalski, Coon Rapids, Minn.

[73] Assignee: American Can Company, Greenwich, Conn.

[21] Appl. No.: 713,889

[22] Filed: Mar. 20, 1985

[51] Int. Cl.⁴ .................. B32B 15/08; B32B 21/08
[52] U.S. Cl. .................... 428/461; 428/513; 428/515; 428/516
[58] Field of Search ............... 428/461, 513, 516, 515, 428/285, 35

[56] References Cited

U.S. PATENT DOCUMENTS

| | | | |
|---|---|---|---|
| 3,480,464 | 11/1969 | Lacy | 428/461 X |
| 4,096,309 | 6/1978 | Stillman | 428/285 |
| 4,188,441 | 2/1980 | Cook | 428/516 X |
| 4,254,173 | 3/1981 | Peer, Jr. | 428/513 X |
| 4,387,126 | 6/1983 | Rebholz | 428/35 |

Primary Examiner—Thomas J. Herbert
Attorney, Agent, or Firm—Paul R. Audet

[57] ABSTRACT

A flexible, laminated packaging material comprising:

(a) an external layer of paper;

(b) a first internal layer of polyethylene affixed to the paper layer;

(c) a second internal layer of metallic foil affixed to the polyethylene layer; and (d) an external, three component, co-extruded layer affixed to the metallic layer which includes a middle co-extrudate of high density polyethylene between outer co-extrudates formed from a blend of an ionomer resin with ethyl methacylate.

6 Claims, 1 Drawing Figure

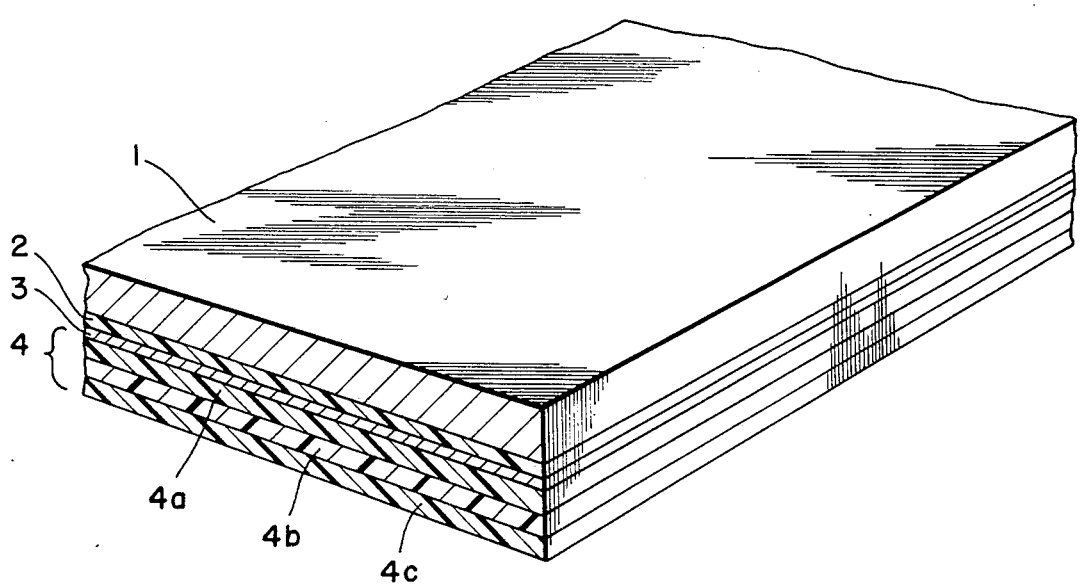

MULTI-LAYER FLEXIBLE PACKAGING MATERIAL

BACKGROUND OF THE INVENTION

1. Field of the Invention

This invention relates to multi-layer flexible packaging materials and in particular to a material which includes a three component, co-extruded layer which imparts to the material superior properties in comparison with prior art materials.

2. Description of the Prior Art

The development of improved flexible packaging materials has been a continuing problem in the packaging and container art. Over the years, numerous flexible laminates have been proposed. For example, Lacy, U.S. Pat. No. 3,480,464, discloses a wrapping or packaging material composed of a paper layer, a first polyolefin layer, a metal layer and a second polyolefin layer. The metal layer is vacuum deposited on the first polyolefin layer. The preferred polyolefin is polyethylene.

Similarly, Gilbert et al, U.S. Pat. No. 4,239,639, shows a multi-layer laminate which can include a paper layer, a foil layer, a Surlyn layer and a polyethylene layer. The laminates can be co-extruded or adhesive mounted. This patent requires an outer layer selected from the group consisting of oriented polypropylene, polyester, cellophane or mixtures thereof.

Stillman, U.S. Pat. No. 4,096,309, shows a laminate which includes paper, polyethylene, metal, and a heat-sealable polyolefin. This patent requires a layer consisting of a nonwoven sheet of spun-bonded polymeric filaments.

Japanese Patent Abstract No. 52-012311 discloses a three layer laminate comprising a base paper laminated to a low density polyethylene film which in turn is metallized with aluminum. Peer, Jr., U.S. Pat. No. 4,254,173, shows a similar paper/polyethylene/vacuum deposited metal laminate.

French Patent Abstract No. 2,454,904 discloses a coextruded three layer film having an inner layer of high density polyethylene and two outer layers which can comprise, among other things, an ionomer resin, e.g., Surlyn.

Cook, U.S. Pat. No. 4,188,441, shows a co-extrusion of high density polyethylene and a blend of an ionomer with a copolymer, such as a copolymer of ethylene and ethyl methacrylate.

Rebholz U.S. Pat. No. 4,387,126 discloses a laminate which can comprise, from outside in, paper, polyolefin adhesive, metal foil and a three layer coextrudate comprising a first layer of ethylene-methyl acrylate, a middle layer of polyester and a third layer of ethylenemethyl acrylate.

In general, materials for use in manufacturing packages or containers must simultaneously satisfy a plurality of demanding conditions. For example, such material must be able to withstand rough and abusive treatment. Also, in many cases, the material must be able to endure prolonged exposure to corrosive substances which are placed in containers made from the material. Further, the material should provide an impervious barrier so as to isolate substances within containers made from the material from the outside atmosphere. In many cases, it is also desirable that the flexible material be such that it can be heat sealed to itself. In addition to the foregoing requirements, the material must retain its flexibility and must not exhibit laminate separation during use.

SUMMARY OF THE INVENTION

It is an object of the present invention to provide a new material which satisfies the foregoing requirements for materials for use in manufacturing packages or containers. In particular, it is the object of the present invention to provide a new material which satisfies these requirements and in addition provide peelability or ready openability.

In accordance with the invention, a flexible, laminated packaging material is provided which comprises:
 an external layer of paper;
 a first internal layer of polyethylene affixed to the paper layer;
 a second internal layer of metallic foil affixed to the polyethylene layer; and
 an external, three component, co-extruded layer affixed to the metallic layer which includes a middle co-extrudate of high density polyethylene between outer co-extrudates formed from a blend of an ionomer resin with ethyl methacrylate.

As discussed in detail below in connection with the preferred embodiments of the invention, it has been found that a laminate having the above structure is superior to prior art laminates in that it also provides for ready openability of the package.

BRIEF DESCRIPTION OF THE DRAWING

The single FIGURE is a perspective view, partially in section, showing the multi-layer, flexible packaging material of the present invention.

DESCRIPTION OF THE PREFERRED EMBODIMENT

As shown in FIG. 1, the present invention provides a multi-layer, flexible packaging material having a paper layer 1, a polyethylene layer 2, a metallic foil layer 3 and a three component, co-extruded layer 4. The co-extruded layer includes a middle co-extrudate 4b of high density polyethylene (HDPE) between outer co-extrudates 4a and 4c formed from a blend of an ionomer resin with ethyl methacrylate (EMA).

Paper layer 1 forms the outer surface of finished containers or packages manufactured from the material of the present invention. By using paper, the outer surface of the container or package is both smooth and non-porous. The smoothness allows containers made from the material to be stacked, slid or otherwise handled without catching or tearing. The smooth surface also helps prevent delamination of the various layers of the material. In addition, the use of paper helps reduce the overall cost of the laminate. Various papers can be used, the preferred paper being 30# Kraft paper.

Polyethylene layer 2 is included in the laminate to add strength and flex-resistance to the final structure. This layer also serves to adhere metallic foil layer 3 to paper layer 1. Polyethylenes of various densities and film thicknesses can be used, the preferred polyethylenes having a density between 0.9155 and 0.9185 $gm/cm^3$ and a thickness of between 0.35 and 0.50 mm. The most preferred polyethylenes have a density of about 0.917 $gm/cm^3$ and a thickness of about 0.40 mm. Polyethylene films having these characteristics have a weight of approximately 7 lbs/rm.

Metallic foil layer 3 may be composed of any of the flexible metal foils known in the art. These foils —such as lead, copper, and preferably aluminum—are ordinarily of a thickness of between 0.30 and 0.35. In addition to providing excellent protection from ultra-violet light, these films have a high resistance to vapor penetration and thus provide an excellent barrier against penetration of either gas or liquids through the laminated material.

The final component of the laminate of the present invention is co-extruded layer 4 which comprises middle co-extrudate 4b of high density polyethylene surrounded on both sides by co-extrudates 4a and 4c formed from a blend of an ionomer resin with ethyl methacrylate. Because of the use of the high density polyethylene and the ionomer resin, this layer, in combination with polyethylene layer 2, serves to provide high tensile strength for the composite laminate. Layer 4 also serves the important function of peelability.

Various ionomer resins i.e., copolymers of ethylene and a vinyl monomer with an acid group, such as methacrylic acid, can be used to form the blends of co-extrudates 4a and 4c. A preferred ionomer resin is that produced by E. I. DuPont deNemours & Co. and sold under the trademark Surlyn. Of the various Surlyn resins, the preferred resin is Surlyn 1652.

The ionomer resin is blended with ethyl methacrylate so as to provide ready peelability of the coextrusion coating. Various ratios of ionomer resin to ethyl methacrylate can be used, the preferred ratios being 70–90 parts ionomer resin to 10–30 parts ethyl methacrylate. The most preferred ratios are 85 parts ionomer resin/15 parts ethyl methacrylate and 75 parts ionomer resin/25 parts ethyl methacrylate. Although it is not necessary that co-extrudates 4a and 4c have the same composition, in practice it has been found convenient to use the same blend for each of these co-extrudates.

Various high-density polyethylenes can be used for middle co-extrudate 4b. The preferred high density polyethylenes have a density of between 0.94 and 0.955 gm/cm$^3$ and a thickness of between 0.75 and 1.1 mm.

Co-extrusion layer 4 can have various thickness and weights per unit area. The preferred thickness are between 1.0 mm and 1.5 mm. The preferred weights per unit area are between 15 and 22 pounds/ream. The most preferred thickness and weight per unit area are approximately 1.0 mm and 15 pounds/ream, respectively.

Co-extrusion layer 4 can have various proportions of middle co-extrudate 4b and surrounding co-extrudates 4a and 4c. In general, middle co-extrudate 4b should comprise no more than about 50% of the total weight of co-extrusion layer 4. Also, the weight of co-extrusion layer 4 not attributable to middle co-extrudate 4b should preferably be equally divided between co-extrudates 4a and 4c. Suitable weight ratios for co-extrudates 4a, 4b and 4c include: approximately 50% for co-extrudate 4b and the remainder approximately evenly divided between outer co-extrudates 4a and 4c; approximately 20% of the total weight for co-extrudate 4b and the remainder approximately evenly divided between outer co-extrudates 4a and 4c; and approximately equal weight contributions by each of co-extrudates 4a, 4b and 4c.

The multi-layer flexible packaging material of this invention may be prepared by any of the means common in the art. The preferred means of such formation will vary in known manner depending upon available machinery and materials. Where convenient, the materials are most easily prepared in subcombinations, which subcombinations are then united. Once the multi-layer flexible packaging material is formed, the manufacturer of bags, pouches and like containers is also within the ordinary skill in the art.

Particularly advantageous multi-layer, flexible packaging materials prepared in accordance with the present invention are shown in Table I.

Containers formed from the materials of examples 1–6 have been found to exhibit the following superior properties in comparison with flexible packaging materials known in the prior art: improved opening and product resistance. Of these examples, Examples 1 and 6 are especially preferred because of more stable peelability levels.

While various embodiments have been chosen to illustrate the invention, it will be understood by those skilled in this art that various changes and modifications can be made therein without departing from the scope of the invention as defined in the appended claims.

TABLE I

| Example | Paper Layer 1 | Polyethylene Layer 2 | Metallic Foil Layer 3 (aluminum) | Surlyn/EMA Layer 4a | HDPE Layer 4b | Surlyn/EMA Layer 4c |
|---|---|---|---|---|---|---|
| | | | | (overall weight: 15#/ream) | | |
| 1 | 30# | 7 lb. | 0.0030 gauge | 25% 85 prts Surlyn 15 prts EMA | 50% | 25% 85 prts Surlyn 15 prts EMA |
| 2 | 30# | 7 lb. | 0.0030 gauge | 33% 85 prts Surlyn 15 prts EMA | 34% | 33% 85 prts Surlyn 15 prts EMA |
| 3 | 30# | 7 lb. | 0.0030 gauge | 40% 85 prts Surlyn 15 prts EMA | 20% | 40% 85 prts Surlyn 15 prts EMA |
| 4 | 30# | 7 lb. | 0.0030 gauge | 40% 75 prts Surlyn 25 prts EMA | 20% | 40% 75 prts Surlyn 25 prts EMA |
| 5 | 30# | 7 lb. | 0.0030 gauge | 33% 75 prts Surlyn 25 prts EMA | 34% | 33% 75 prts Surlyn 25 prts EMA |
| 6 | 30# | 7 lb. | 0.0030 gauge | 25% 75 prts Surlyn 25 prts EMA | 50% | 25% 75 prts Surlyn 25 prts EMA |

What is claimed is:

1. A flexible, laminated packaging material comprising:
   (a) an external layer of paper;
   (b) a first internal layer of polyethylene affixed to the paper layer;
   (c) a second internal layer of metallic foil affixed to the polyethylene layer; and (d) an external three-component, co-extruded layer affixed to the metallic foil layer which includes a middle co-extrudate of high density polyethylene between outer co-extrudates formed from a blend of an ionomer resin with ethyl methacrylate, one said outer coextrudate affixed to said foil layer and the other said outer co-extrudate is an outermost surface.

2. A flexible, laminated packaging material according to claim 1 wherein the blend of ionomer resin with ethyl methacrylate is in the proportion of approximately 85 parts ionomer resin to approximately 15 parts ethyl methacrylate.

3. A flexible, laminated packaging material according to claim 1 wherein the blend of ionomer resin with ethyl methacrylate is in the proportion of approximately 75 parts ionomer resin to approximately 15 parts ethyl methacrylate.

4. A flexible, laminated packaging material according to claim 1 wherein approximately 50 percent of the weight of the three component, co-extruded layer is contributed by the middle co-extrudate and the remaining weight of said layer is approximately evenly divided between the outer co-extrudates.

5. A flexible, laminated packaging material according to claim 1 wherein approximately 20 percent of the weight of the three component, co-extruded layer is contributed by the middle co-extrudate and the remaining weight of said layer is approximately evenly divided between the outer co-extrudates.

6. A flexible, laminated packaging material according to claim 1 wherein the weight of the three component, co-extruded layer is contributed approximately equally by the three co-extrudates.

* * * * *